United States Patent
Kiyokawa

(10) Patent No.: US 6,636,260 B2
(45) Date of Patent: Oct. 21, 2003

(54) IMAGE PROCESSING USING A PROFILE SELECTION BASED ON PHOTOGRAPHING CONDITION

(75) Inventor: Jun Kiyokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/102,653

(22) Filed: Jun. 23, 1998

(65) Prior Publication Data

US 2003/0112334 A1 Jun. 19, 2003

(30) Foreign Application Priority Data

Jun. 24, 1997 (JP) .............................. 9-167188
Jun. 4, 1998 (JP) ........................... 10-156013

(51) Int. Cl.[7] ............................................. H04N 5/228
(52) U.S. Cl. ................................................... 348/222.1
(58) Field of Search ........................... 348/207, 222.1, 348/223.1, 251, 29, 229, 232, 209.99, 207.99; 382/162; 396/128; 358/518, 527, 528; H04N 5/228

(56) References Cited

U.S. PATENT DOCUMENTS

| 4,488,245 A | * | 12/1984 | Dalke et al. ................. 382/167 |
| 4,907,071 A | * | 3/1990 | Belmares-Sarabia et al. .......................... 348/586 |
| 5,136,379 A | * | 8/1992 | Ishii ........................ 348/392.1 |
| 5,754,682 A | * | 5/1998 | Katoh ......................... 348/227 |
| 5,982,416 A | * | 11/1999 | Ishii et al. ..................... 348/29 |
| 6,108,441 A | * | 8/2000 | Hiratsuka et al. ........... 382/167 |
| 6,249,315 B1 | * | 6/2001 | Holm ......................... 348/251 |
| 6,301,440 B1 | * | 10/2001 | Bolle et al. ................. 348/229 |

* cited by examiner

Primary Examiner—Tuan Ho
(74) Attorney, Agent, or Firm—Fitzpatrick, Cella, Harper & Scinto

(57) ABSTRACT

For an image photographed by a digital still camera or the like, color matching cannot be performed because photographing conditions of the image cannot be specified. The effect of a CMS cannot be expected even when one profile is prepared for such an input device as a digital still camera. In this invention, a photographed image and the photographing conditions of the image are input. An input profile closest to the photographing conditions is selected from a plurality of input profiles stored in an external storage. On the basis of the selected input profile, color matching processing is performed on the input image.

15 Claims, 8 Drawing Sheets

FIG. 3

| REFERENCE PHOTOGRAPHING CONDITION | PROFILE |
|---|---|
| UNDER LIGHT SOURCE A | PROFILE #1 |
| UNDER LIGHT SOURCE B | PROFILE #2 |
| UNDER LIGHT SOURCE C | PROFILE #3 |
| ⋮ | ⋮ |
| ⋮ | ⋮ |

FIG. 6

| PHOTOGRAPHING CONDITIONS | SELECTION PROFILE |
|---|---|
| 1 | PROFILE #1 |
| : | |
| X | |
| X + 1 | PROFILE #2 |
| : | |
| Y | |
| Y + 1 | PROFILE #3 |
| : | |
| Z | |

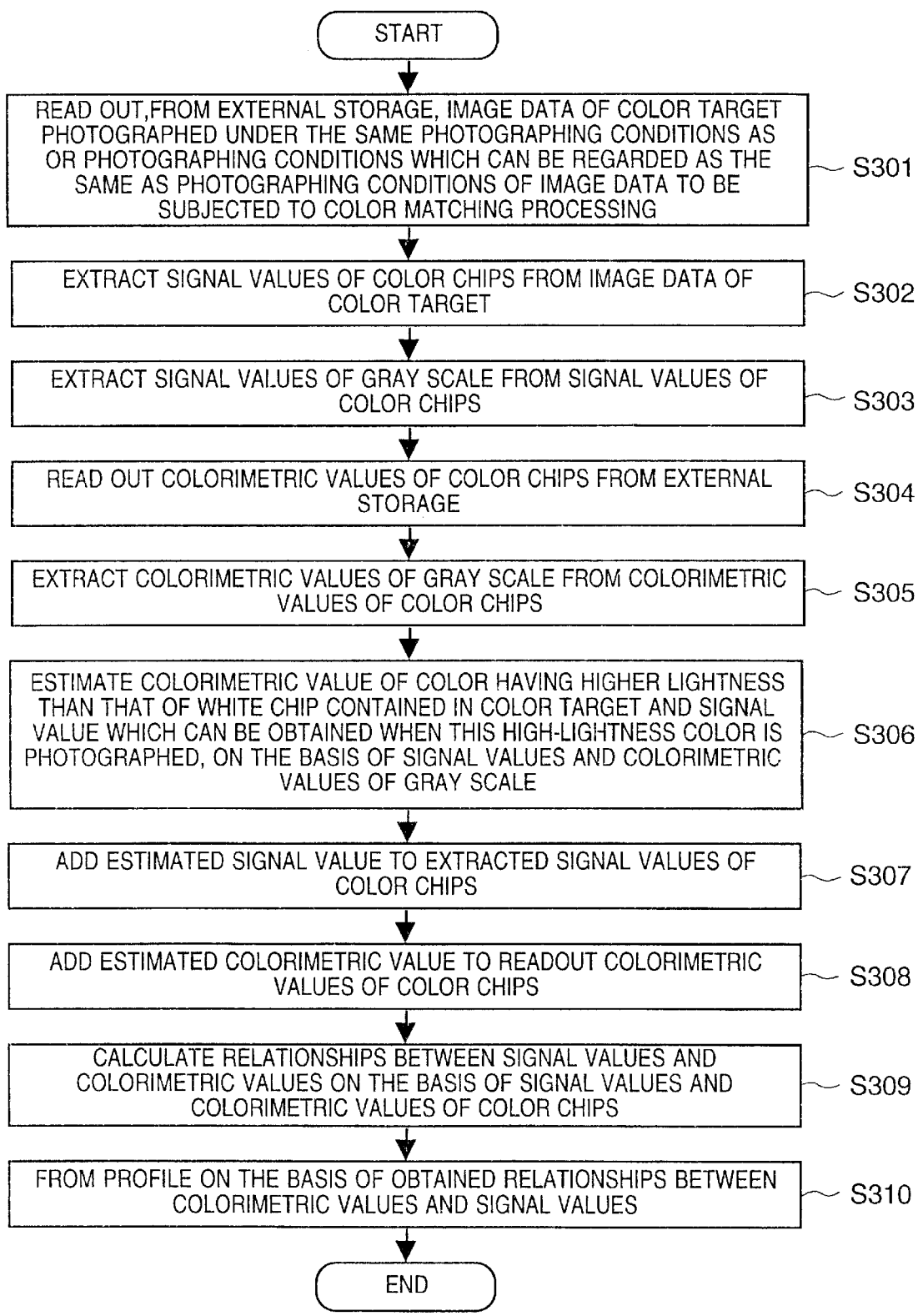

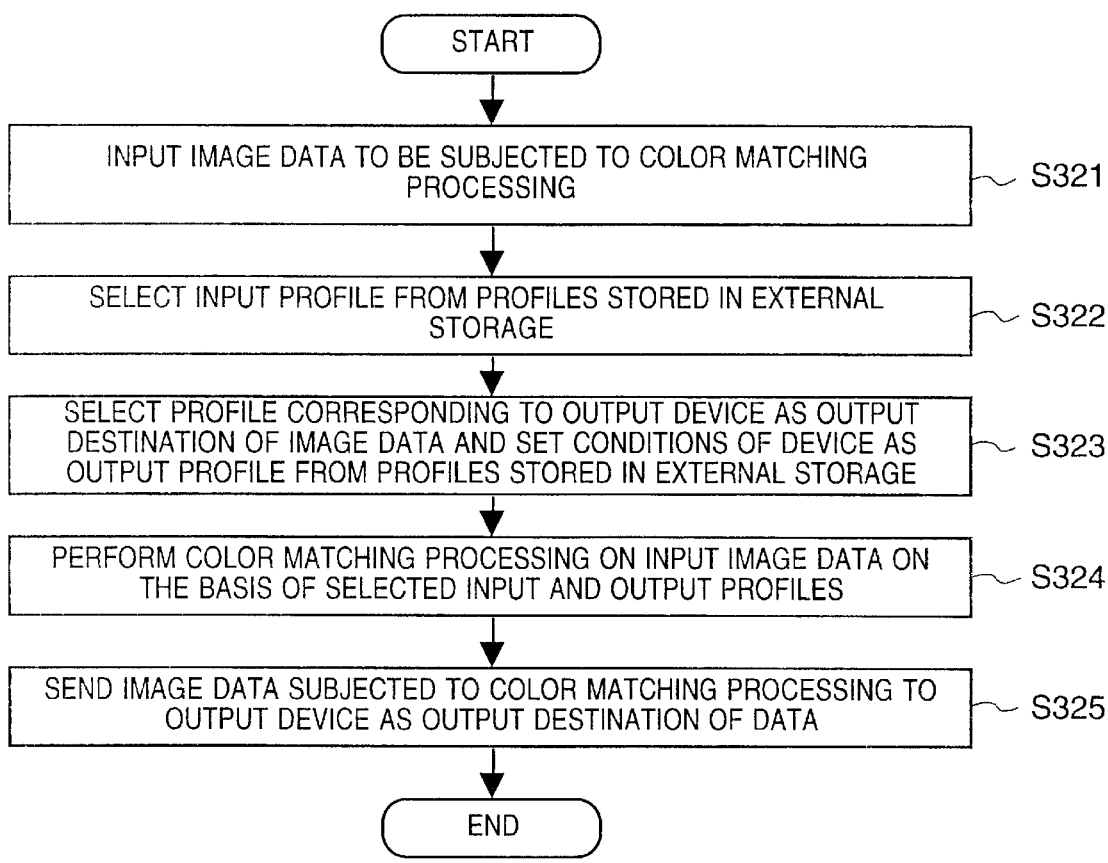

IMAGE PROCESSING USING A PROFILE SELECTION BASED ON PHOTOGRAPHING CONDITION

BACKGROUND OF THE INVENTION

1. Field of the Invention

The present invention relates to an image processing apparatus and method and, more particularly, to an image processing apparatus and method of performing color matching processing on an input image photographed by a digital still camera or a digital video camera.

2. Description of the Related Art

In multimedia systems centering around host computers, a color matching system (CMS) for performing image data color matching processing between input and output devices is being extensively developed.

ColorSync™ of Apple Computer, Inc. as a representative CMS framework realizes a common CMS on a system by converting an image signal in a color space (Device Dependent Color Space) dependent on an input device into an image signal in a color space (Device Independent Color Space) independent of the device and further converting this image signal in the device independent color space into an image signal in a color space dependent on an output device.

Conversion characteristics for this conversion process are stored in data called a profile having Inter Color Profile Format. Profiles are prepared in a host computer in a one-to-one correspondence with devices. In performing conversion, one profile is automatically or manually selected, and the color space of an image signal is converted in accordance with the conversion characteristics of the selected profile.

In the above system, an image input device such as a flat bed scanner is directly connected to a host computer. If the characteristics of this input device remain unchanged, the effect of the CMS can be expected by using the conversion characteristics of a single profile of the host computer.

Unfortunately, the color characteristics of images such as those photographed by a digital still camera or a digital video camera are largely influenced by the photographing conditions. Therefore, color matching cannot be performed because the photographing conditions cannot be specified. Accordingly, the effect of the CMS cannot be expected when a single profile is prepared for an image input device such as a digital still camera or a digital video camera. In addition, if the photographing conditions and conversion characteristics do not match, unpreferable conversion is performed. As the photographing conditions, it is possible to prepare a plurality of profiles corresponding to the colors, i.e., white balances or exposure amounts of illuminating light during photographing. However, it is impractical to prepare profiles corresponding to all possible photographing conditions.

In an image input device represented by a flat bed scanner, a profile can be formed by the following method. That is, an image input device for forming a profile is used to scan or photograph a color target having a plurality of color chips. Signal values corresponding to these color chips in a device independent color space are compared with the signal values, obtained by scanning or photographing the color target, of the color chips in a color space dependent on the image input device. In this manner, color conversion characteristics or a profile for converting the color signal from the color space dependent on the image input device to the device independent color space is acquired.

In the above method of deriving color conversion characteristics by scanning or photographing a color target, the color target is inexpensive, and any user can easily perform the work. Therefore, the method has a great merit for the user.

In the following description, signal values in a device independent color space will be sometimes referred to as "colorimetric values". Similarly, signal values in a device dependent color space will be simply referred to as "signal values" in some cases.

The above color conversion characteristics deriving method is based on the assumption that an original has no brighter color than the brightest white of the color target. The object of a device such as a flat bed scanner is to scan a paper original and store or copy the original image. Such devices are originally so designed as to read "paper white" as the brightest color. Hence, the above assumption is practical in the color reproduction range of paper as a medium.

A cloud contained in scenery sometimes has a brighter color than the brightest white of the color target. Accordingly, image input devices such as a digital still camera and a digital video camera are so designed as to read a color with lightness much higher than that of "paper white" as the brightest color.

However, even when the color target is photographed by a digital still camera or a digital video camera, it is impossible to obtain a color signal having brightness larger than a certain value. Even if color conversion characteristics are acquired from the colorimetric values of color chips of the color target and signal values obtained by photographing the color target, no accurate color conversion characteristics can be obtained for an object such as a cloud including a high-lightness color.

SUMMARY OF THE INVENTION

It is an object of the present invention to provide an image processing apparatus and method suited to performing color matching processing corresponding to the photographing conditions of each individual input image.

To achieve the above object, one preferred embodiment of the present invention discloses an image processing apparatus comprising: input means for inputting a color image and a photographing condition of the color image; selecting means for selecting a profile corresponding to the photographing condition from a plurality of profiles stored in a memory; and processing means for performing color matching processing on the input color image on the basis of the selected profile.

It is another object of the present invention to provide an image processing apparatus and method suited to performing color matching processing on an image photographed by a digital still camera or a digital video camera with accuracy higher than that of the digital still camera or the digital video camera.

To achieve the above object, another preferred embodiment of the present invention discloses an image processing apparatus comprising: input means for inputting a photographed color image and a photographing condition of the color image; selecting means for selecting a profile corresponding to the photographing condition from a plurality of profiles stored in a memory; and processing means for storing the input color image and the selected profile in a medium.

It is still another object of the present invention to provide an image processing apparatus and method capable of easily obtaining accurate color conversion characteristics for an image input device such as a digital still camera or a digital video camera. It is still another object of the present invention to provide an image processing apparatus and method of performing color matching processing on the basis of the color conversion characteristics obtained for the image input device.

To achieve the above objects, other preferred embodiments of the present invention provide an image processing apparatus comprising: a memory for storing reference image data obtained by photographing a reference image including a plurality of color chips, and color data in a device independent color space of the color chips; selecting means for selecting reference image data corresponding to a photographing condition of a color image; and calculating means for calculating, on the basis of photographing data of the color chips obtained from the selected reference image data and color data of the color chips, a conversion characteristic for converting the photographing data into the color data and the image processing apparatus further comprising: input means for inputting a color image and a photographing condition of the color image; and processing means for performing color matching processing on the input color image on the basis of the conversion characteristic calculated by said calculating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing the correspondence between groups of photographing conditions and profiles;

FIG. 6 is a view showing a table containing input profiles to be selected in accordance with the photographing conditions;

FIG. 7 is a flow chart showing a color conversion characteristic deriving process in the second embodiment; and FIG. 8 is a flow chart showing the procedure of color matching processing in the second embodiment;

DETAILED DESCRIPTION OF THE PREFERRED EMBODIMENTS

Image processing in image processing apparatuses according to preferred embodiments of the present invention will be described in detail below with reference to the accompanying drawings.

First Embodiment

[Arrangement]

Figure 1:
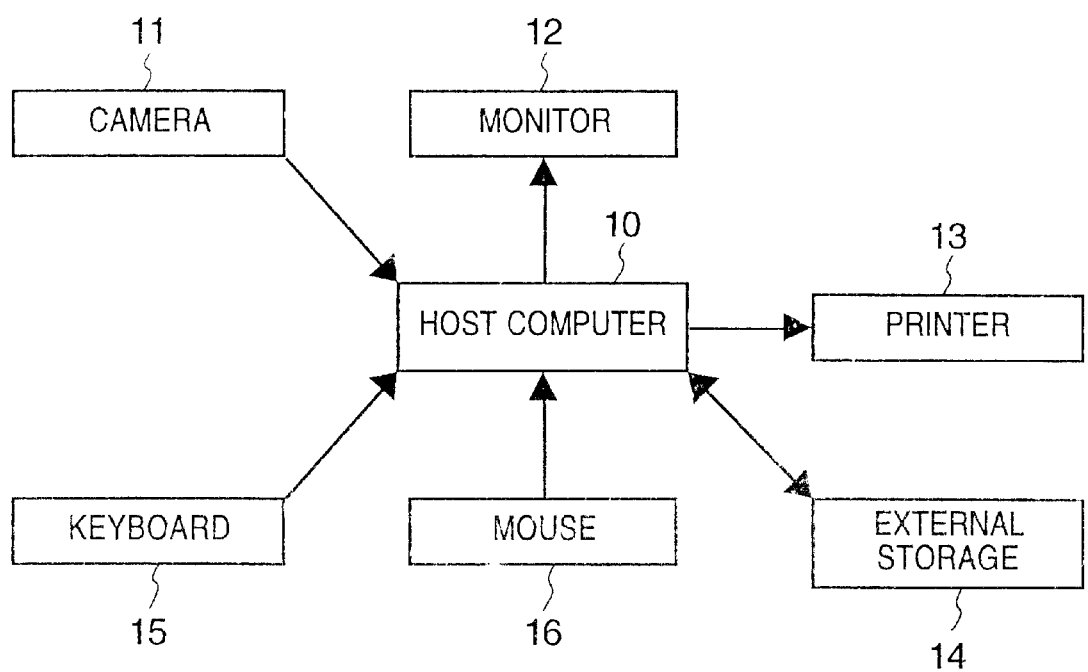
FIG. 1 is a block diagram showing the arrangement of an image processing system according to an embodiment of the present invention.

FIG. 1 is a block diagram showing the system configuration of this embodiment.

This system comprises a camera 11 as an input device, a host computer 10 for performing image processing including color matching processing and edit processing on image data, and a monitor 12 and a printer 13 as output devices. Note that the host computer 10 can also be a personal computer for executing software having functions to be described later or dedicated hardware having similar functions.

The camera 11 is an image or picture input device such as a digital still camera or a digital video camera and can take various environmental conditions and adjustment states in photographing. Therefore, the camera 11 varies its photographing conditions (input characteristics) from one photographing to another, so the input characteristics cannot be specified. Also, the camera 11 can process both motion and still images.

The monitor 12 is an image display device such as a CRT display or a liquid crystal panel display. The monitor 12 displays images and information which a user requires to input data to the system or check the operation of the system. The printer 13 is a printing apparatus which is an image output device for forming a visual image on a recording medium such as a recording sheet by using a recording material such as ink or toner.

An external storage 14 includes a recording medium such as a hard disk, a magnetooptical disk, or a floppy disk, and a drive for reading and writing the recording medium. The host computer 10 causes the external storage 14 to store image data supplied from the camera 11 and performs image processing on the stored image data. Also, the host computer 10 supplies the stored unprocessed or processed image data to the monitor 12 or the printer 13 to display or print an image corresponding to the image data.

Furthermore, the host computer 10 causes the external storage 14 to store photographing conditions supplied from the camera 11 or input by a user in connection with object image data. In this manner the host computer 10 can read out image data and photographing conditions corresponding to the image data from the external storage 14.

The external storage 14 also stores profiles necessary for color matching processing. If necessary, the host computer 10 reads out a profile stored in the external storage 14 and performs color matching processing.

Image processing programs and device control programs according to the present invention are usually stored in the host computer 10. However, these programs can also be stored in the external storage 14. That is, in accordance with instructions from a user, the host computer 10 can read out a program stored in the external storage 14 and execute image processing and device control according to the embodiment of the present invention.

A keyboard 15 and a mouse 16 are operated, where necessary, by a user to input instructions or data to the host computer 10.

[Host Computer]

Figure 2:
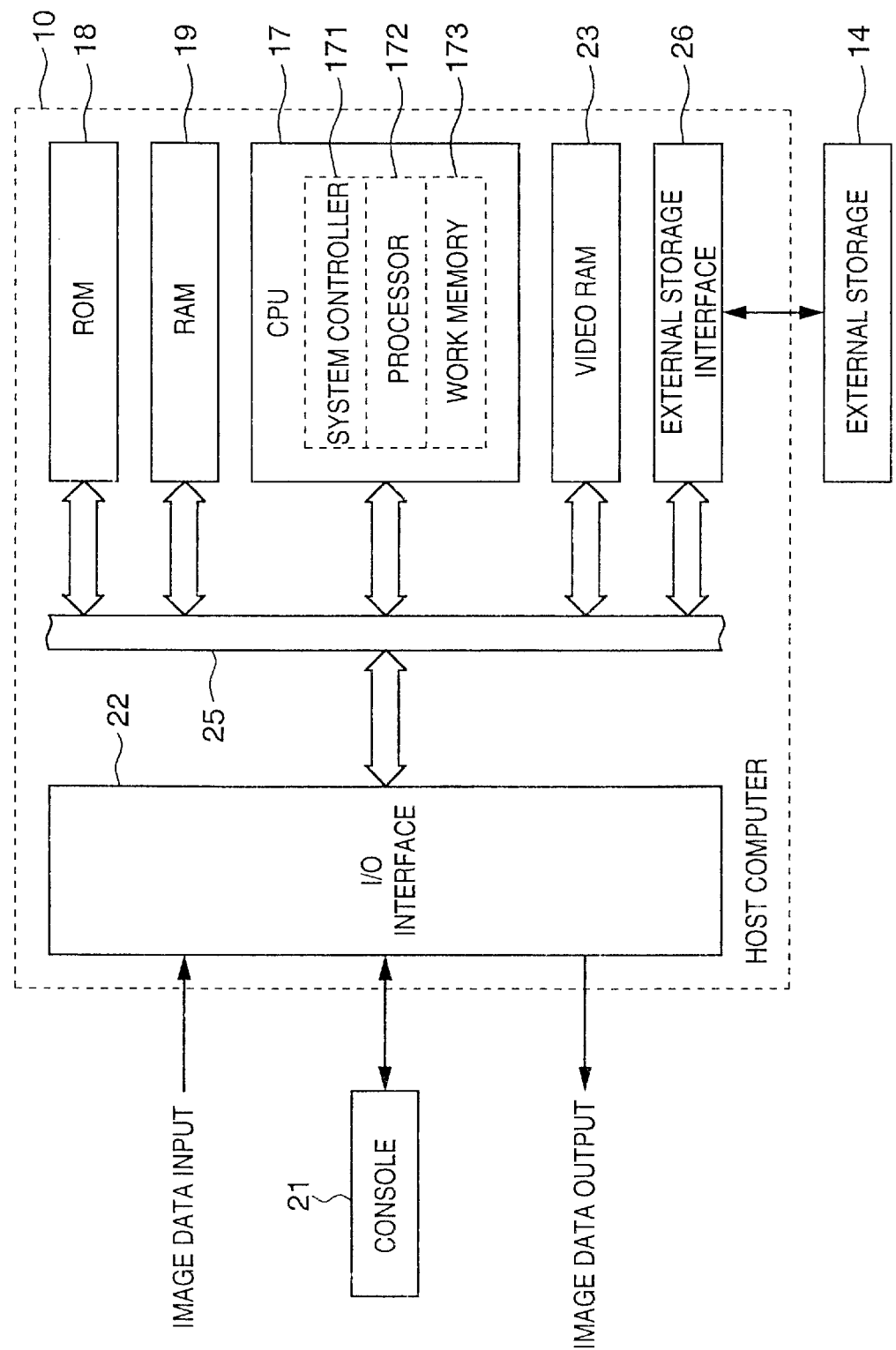
FIG. 2 is a block diagram showing the arrangement of a host computer shown in FIG. 1.

FIG. 2 is a block diagram showing the arrangement of the host computer 10. Referring to FIG. 2, a console 21 including the keyboard 15, the mouse 16, and the monitor 12 is connected to a CPU 17 through an I/O interface 22 and a CPU bus 25. The external storage 14 is connected to the CPU 17 through an external storage interface 26 and the CPU bus 25.

The CPU 17 has a system controller 171 for controlling the entire system, a processor 172 for executing various arithmetic operations, and a work memory 173 for temporarily storing necessary data during arithmetic operations. On the basis of programs stored in a ROM 18 or a RAM 19, the CPU 17 performs image processing such as color matching processing on image data, read out by the host computer 10 and stored in the RAM 19, and outputs the processed image data to an output device.

A video RAM 23 stores the pictures to be displayed on the monitor 12.

[Color Matching Processing]

In this system, the following input device-output device combinations are possible. Note that combination (4) is a combination for performing so-called "preview". This combination is used to display an output image from the printer 13 on the monitor 12 to allow a user to check the image.

(1) Camera 11→Monitor 12
(2) Camera 11→Printer 13
(3) Monitor 12→Printer 13
(4) Printer 13→Monitor 12

To perform color matching processing corresponding to any of the above combinations, the CPU 17 reads out an input profile corresponding to the input device and an output profile corresponding to the output device from the external storage 14. Each profile stores data representing the relationship between a device dependent color space and a device independent color space. Therefore, the input profile stores data for converting an image signal in a color space dependent on the input device into an image signal in a device independent color space. On the other hand, the output profile stores data for converting the image signal in the device independent color space into an image signal in a color space dependent on the output device. The data of the output profile sometimes further contains color space compression for compressing input image data into the range of color reproduction of the output device, in addition to the color space conversion.

That is, on the basis of the input device-output device combination, the CPU 17 first reads out an input profile from the external storage 14. By using this input profile, the CPU 17 converts an image signal in a color space dependent on the input device into an image signal in a device independent color space.

Next, the CPU 17 reads out an output profile corresponding to the output device from the external storage 14. By using this output profile, the CPU 17 converts the image signal in the device independent color space into an image signal in a color space dependent on the output device.

As described above, a profile used in the color matching processing is data based on the characteristics of a device.

The phosphor or color filter and the use environment of the monitor 12 can be specified. Analogously, the recording medium, recording material, and image formation method of the printer 13 can be previously specified. Therefore, the output characteristics of the monitor 12 and the printer 13 can be previously known. Accordingly, data based on the specified output characteristics can be used as profiles.

In contrast, the characteristics of images photographed by the camera 11 vary from one image to another. Therefore, various photographing conditions of the camera 11 are classified into several representative groups having a one-to-one correspondence with input profiles. That is, one profile corresponds to photographing conditions included in the same group.

FIG. 3 is a view showing the correspondence between photographing condition groups and profiles. Photographing condition groups (to be referred to as "reference photographing conditions" hereinafter) and corresponding input profiles are stored in the external storage 14 or the camera 11 so that the host computer 10 can read out both data.

More specifically, it is only necessary to form a plurality of input profiles on the basis of a plurality of images photographed by the camera 11 under a plurality of representative photographing conditions (e.g., colors, white balances, and exposure amounts of illuminating light during photographing).

[Procedure]

Figure 4:
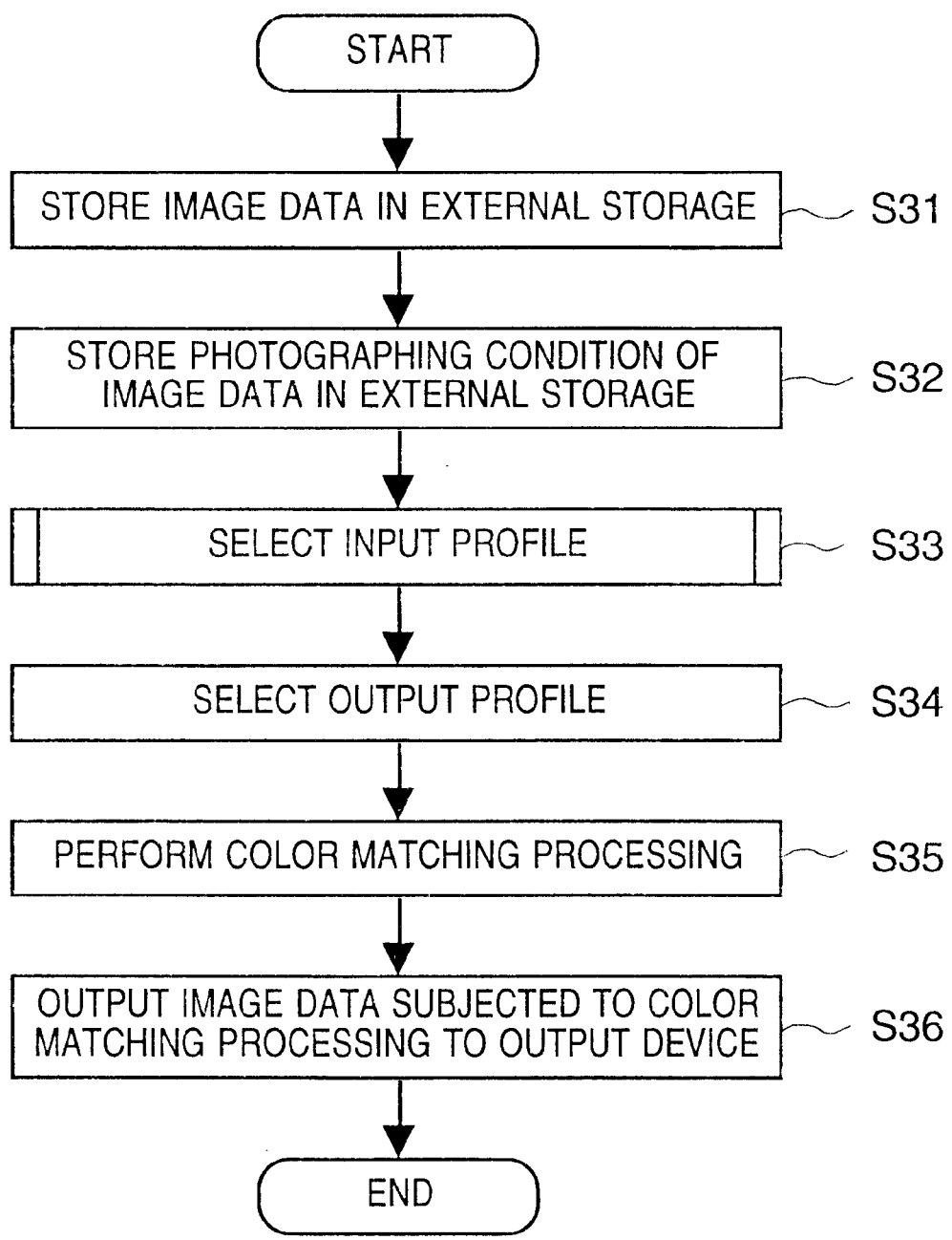
FIG. 4 is a flow chart showing the procedure of color matching processing in the first embodiment.

FIG. 4 is a flow chart showing the procedure of the color matching processing in this embodiment executed by the CPU 17.

In step S31, the CPU 17 stores input image data from the camera 11 into the external storage 14. In step S32, the CPU 17 stores an input photographing condition of the image data from the camera 11 into the external storage 14.

In steps S33 and S34, the CPU 17 selects input and output profiles used in the color matching processing. In step S35, the CPU 17 performs the color matching processing on the image data. In step S36, the CPU 17 outputs the image data subjected to the color matching processing to an output device, i.e., the monitor 12 or the printer 13.

Figure 5:
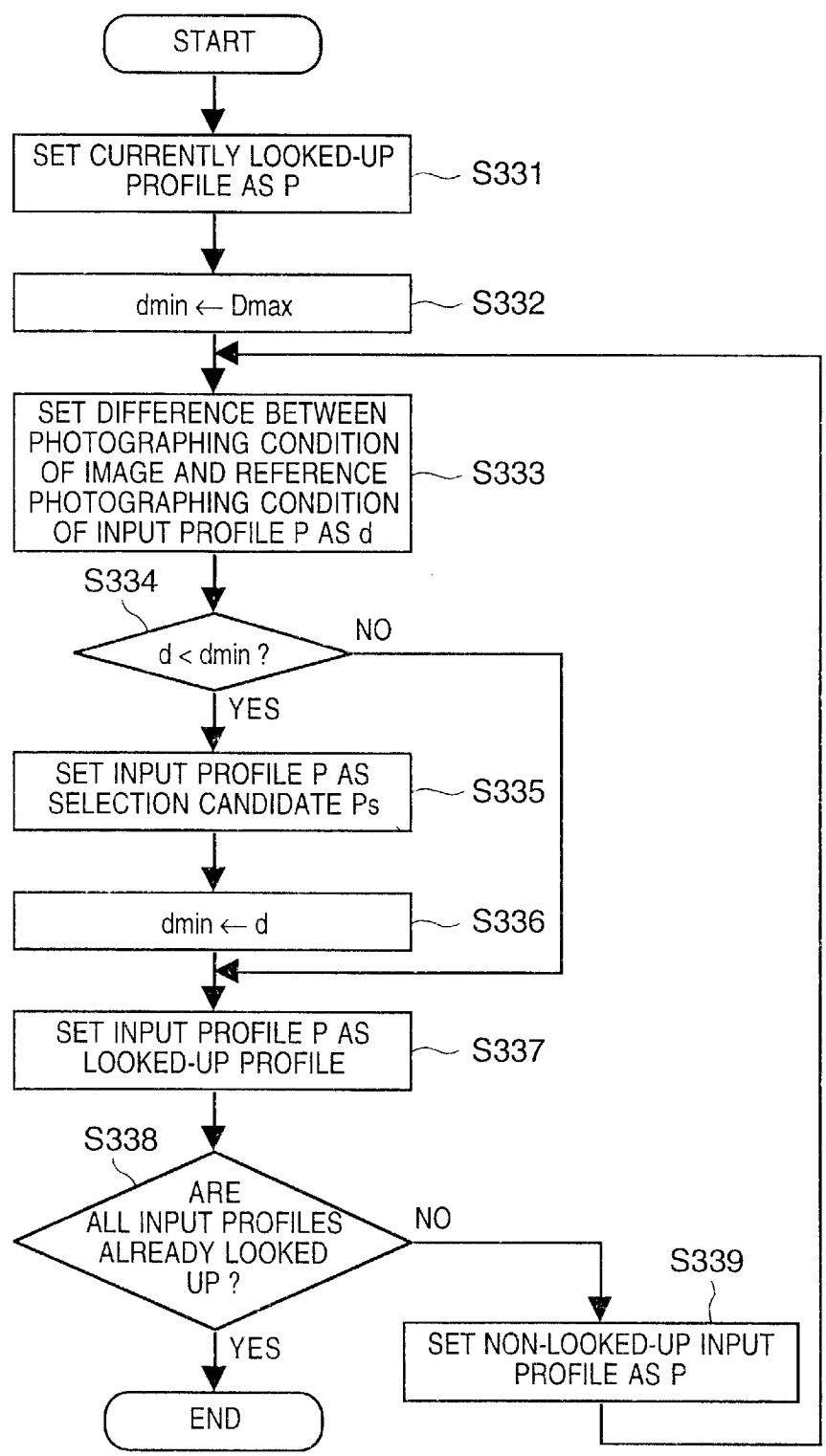
FIG. 5 is a flow chart showing details of a step of selecting an input profile.

FIG. 5 is a flow chart showing details of step S33 for selecting an input profile.

In step S331, of the input profiles stored in the external storage 14 and corresponding to the camera 11, the CPU 17 sets an input profile that is currently being looked up as P. In tep S332, the CPU 17 substitutes a maximum value Dmax of a photographing condition difference into dmin. For example, the photographing condition is color temperature, a white point and the like. In step S333, the CPU 17 sets the difference between the photographing condition of the input image data and the reference photographing condition of the input profile P as d. In step S334, the CPU 17 compares d with dmin. If d≧dmin, the flow jumps to step S337. If d<dmin, the flow advances to step S335, and the CPU 17 sets the input profile P as an input profile selection candidate Ps. In step S336, the CPU 17 substitutes d into dmin.

In step S337, the CPU 17 sets a value indicating "lookup done" in a flag corresponding to the input profile P. In step S338, the CPU 17 checks whether the value indicating "lookup done" is set in flags of all of the input profiles stored in the external storage 14 and corresponding to the camera 11. If YES in step S338, the CPU 17 sets the input profile set as the selection candidate Ps as a selected input profile and returns to the main processing flow in FIG. 4.

If input profiles which correspond to the camera 11 and are not looked up yet remain in the external storage 14, the flow advances to step S339, and the CPU 17 changes the input profile P to be referred to. After that, the flow returns to step S333.

As described earlier, the output characteristics of the monitor 12 and the printer 13 as output devices can be specified. In step S34, therefore, the CPU 17 need only select an output profile corresponding to the characteristics of an output device designated by a user.

In this embodiment as described above, in accordance with the photographing condition of input image data from the camera 11, an input profile best suited to the photographing condition can be selected from a limited number of input profiles fewer than possible photographing conditions. Consequently, appropriate color space conversion can be performed.

A table as shown in FIG. 6 can also be formed and stored in the external storage 14 by previously calculating input profiles to be selected for individual corresponding photographing conditions, i.e., calculating the approximations of individual photographing conditions to the reference photographing conditions of input profiles stored in the external storage 14. An input profile can be selected in step S33 on the basis of this table.

A profile used in the above embodiment can be data representing a transformation function such as a 3×3 matrix or data of a transformation table. Also, a profile can of course have a format such as Inter Color Profile Format based on an arbitrary standard.

In the above embodiment, color matching processing is performed on color image data by using a profile having closest relevance to the photographing condition. However, the present invention is not limited to the above embodiment. For example, color image data and a profile having closest relevance to the data can be paired and stored in a medium such as a tape or disk medium, the main body of a host computer, an external storage, or a video camera. This advantageously reduces the load when stored color images are processed later.

Second Embodiment

Image processing for deriving color conversion characteristics according to the present invention will be described below. The arrangement of an image processing apparatus for realizing the image processing of the second embodiment is the same as in the first embodiment, so a detailed description thereof will be omitted. However, since conversion characteristics are calculated on the basis of the colorimetric values and signal values of color chips of a color target, an external storage 14 stores the colorimetric values of color chips of a color target and an image obtained by photographing the color target.

[Method of Deriving Color Conversion Characteristics]

A method of deriving conversion characteristics from the colorimetric values (standard values) of color chips of a color target and signal values obtained by, photographing the color target will be described below. Note that the colorimetric values and signal values of color chips previously stored in the external storage 14 are represented by an XYZ colorimetric system and an RGB colorimetric system, respectively, and that a signal value can be converted into a colorimetric value by:

$$\begin{bmatrix} X \\ Y \\ Z \end{bmatrix} = M \begin{bmatrix} R \\ G \\ B \end{bmatrix} \quad (1)$$

Calculating optimum color conversion characteristics is to optimize a matrix M of equation (1), i.e., to substitute the signal values of color chips obtained by photographing the color target into equation (1) to determine the elements of the matrix M by which errors between the calculated colorimetric values of the color chips and the colorimetric values of the color chips stored in the external storage 14 are minimized. In other words, this matrix M represents the color conversion characteristics as the relationships between the signal values and the colorimetric values.

Equation (1) is applicable to a color not included in the color target. Therefore, a color having higher lightness as a colorimetric value than that of the brightest white in the color target can be converted. However, digital still cameras are so designed that signal values RGB obtained by photographing a gray scale (neutral colors) having a colorimetric value Y in the color target have relationships represented using constants $\alpha_R$, $\alpha_G$, $\alpha_B$, $\beta_R$, $\beta_G$, $\beta_B$, $\gamma_R$, $\gamma_G$, and $\gamma_B$ by $$R = \alpha_R \left(\frac{Y}{\beta_R}\right)^{\gamma_R} \quad (2)$$

$$G = \alpha_G \left(\frac{Y}{\beta_G}\right)^{\gamma_G}$$

$$B = \alpha_B \left(\frac{Y}{\beta_B}\right)^{\gamma_B}$$

A gray scale is a group of neutral colors. Therefore, colorimetric values X and Z corresponding to the colorimetric value Y have relationships represented using constants $\alpha_X$ and $\alpha_Z$ as $$X = \alpha_X \cdot Y$$

$$Z = \alpha_Z \cdot Y \quad (3)$$

Accordingly, by calculating the constants in equations (2) and (3) from the colorimetric values of a gray scale in a color target and the signal values obtained by photographing the gray scale, conversion coefficients with higher accuracy than when equation (1) is used can be obtained for the colors in the gray scale. In addition, it is possible by the use of the obtained conversion coefficients to estimate, from the gray scale of the color target, the colorimetric value of white having higher lightness as a colorimetric value than white contained in the color target. A signal value which can be obtained by photographing the estimated white is estimated by extrapolation or the like. The colorimetric value and the signal value of the estimated white are used in an arithmetic operation of color correction coefficients. This decreases errors of color correction coefficients with respect to such high-lightness colors. Consequently, it is possible to obtain a profile having accurate color conversion characteristics with respect to a high-lightness color not contained in a color target, particularly white. By applying this profile to a CMS, high-accuracy color matching can be performed on an image or picture photographed by an image input device such as a digital still camera or a digital video camera.

[Procedure]

FIG. 7 is a flow chart showing the process of deriving color conversion characteristics in this embodiment executed by a CPU 17.

In step S301, the CPU 17 reads out, from the external storage 14, image data of a color target photographed under the same photographing conditions as or photographing conditions which can be regarded as the same as the photographing conditions of an object in image data to be subjected to color matching. In step S302, the CPU 17 extracts the signal values of color chips from the readout image data of the color target. In step S303, the CPU 17 extracts the signal values of a gray scale from the extracted signal values of the color chips.

In step S304, the CPU 17 reads out the colorimetric values of the color chips in the color target. In step S305, the CPU 17 extracts the colorimetric values of the gray scale from the readout colorimetric values of the color chips.

In step S306, from the extracted signal values and colorimetric values of the gray scale, the CPU 17 estimates the colorimetric value of a color having higher lightness than that of a white chip contained in the color target and a signal value which can be obtained when this high-lightness color is photographed. In step S307, the CPU 17 adds the estimated signal value to the extracted signal values of the color chips. In step S308, the CPU 17 adds the estimated colorimetric value to the readout colorimetric values of the color chips.

In step S309, the CPU 17 calculates the relationships between the signal values and the colorimetric values on the basis of the signal values and the colorimetric values of the color chips. In step S310, the CPU 17 forms a profile on the basis of the calculated relationships between the colorimetric values and the signal values. The obtained profile is stored in the external storage 14 or a RAM 19.

Note that in step S301, photographing conditions are designated or image data of a color target is selected by a user or on the basis of data indicating photographing conditions added to image data to be subjected to the color matching processing by using data indicating the photographing conditions of a profile to be formed, e.g., a formed profile. Also, the processing shown in FIG. 3 can be performed on image data of a color target photographed under different conditions. Alternatively, it is possible to group nearly identical photographing conditions and perform the processing shown in FIG. 3 on image data of a color target photographed under a representative photographing condition of the group. Profiles corresponding to these photographing conditions can be previously formed and stored in the external storage 14.

FIG. 8 is a flow chart showing the color matching processing in this embodiment executed by the CPU 17.

In step S321, the CPU 17 inputs image data to be subjected to the color matching processing from, e.g., a camera 11 to a host computer 10. In step S322, the CPU 17 selects an input profile from profiles stored in the external storage 14. This selection is done by a user on the basis of the photographing conditions of the input image data or done on the basis of data indicating photographing conditions added to the input image data.

In step S323, of the profiles stored in the external storage 14, the CPU 17 selects, as an output profile, a profile corresponding to an output device (e.g., a monitor 12 or a printer 13) desired by the user as an output destination of the image data and the set condition of the desired output device.

In step S324, the CPU 17 performs color matching processing on the input image data on the basis of the selected input and output profiles. In step S325, the CPU 17 sends the image data thus subjected to the color matching processing to an output device as an output destination.

In this embodiment as described above, by using devices and works similar to those in a method of forming a profile in a flat bed scanner, accurate profiles can be formed for image input devices such as a digital still camera and a digital video camera. Therefore, it is possible to perform high-accuracy color matching processing on images and pictures such as scenery photographed by these image input devices and obtain good color matching results.

The color conversion characteristics deriving process of forming a profile and the color matching processing are separately described with reference to FIGS. 7 and 8. However, it is of course possible to execute these processes as a series of processes.

Also, in the second embodiment, the relationships between colorimetric values and signal values, i.e., color conversion characteristics are profiled on the basis of the assumption that a CMS framework such as ColorSync™ is used. However, the present invention includes a case wherein color conversion is performed without profiling. That is, effects similar to those in the second embodiment can be obtained when color matching is performed for pixels of image data on the basis of the color conversion characteristics obtained by the process shown in FIG. 6.

Furthermore, profiles obtained by the procedure shown in FIG. 6 can be used for image data photographed by a normal photographing mode. On the other hand when image data photographed by a macro photographing mode is to be processed, whether the process of estimating a color having higher lightness than that of a white chip in a color target, which is contained in the procedure shown in FIG. 6, is to be performed is determined in accordance with the setting by a user. If no estimation processing is to be performed, steps S303 and 305 to S308 in FIG. 6 are passed through.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    a memory storing reference image data obtained by photographing a reference image including a plurality of color chips, and color data in a device independent color space of the color chips;
    selecting means for selecting, from the reference image data in the memory, reference image data corresponding to a photographing condition of a color image; and
    calculating means for calculating, on the basis of photographing data of the color chips obtained from the selected reference image data and color data of the color chips, a conversion characteristic for converting the photographing data into the color data.

2. The apparatus according to claim 1, further comprising estimating means for estimating photographing data and color data of a color having higher lightness than a lightness of a white chip contained in the reference image, on the basis of photographing data and color data of a gray scale contained in the selected reference image data,
    wherein said calculating means calculates the conversion characteristic by adding the estimated photographing data and color data to the photographing data and color data of the color chips.

3. The apparatus according to claim 1, further comprising:
    input means for inputting a color image and a photographing condition of the color image; and
    processing means for performing color matching processing on the input color image on the basis of the conversion characteristic calculated by said calculating means.

4. The apparatus according to claim 1, wherein the conversion characteristic calculated by said calculating means is stored in said memory.

5. The apparatus according to claim 1, further comprising:
    input means for inputting a color image and a photographing condition of the color image;
    acquiring means for acquiring a conversion characteristic corresponding to the photographing condition from a plurality of conversion characteristics stored in said memory; and
    processing means for performing color matching processing on the input color image on the basis of the acquired conversion characteristic.

6. The apparatus according to claim 5, wherein said acquiring means further acquires a conversion characteristic corresponding to a device for outputting the input color image, and said processing means performs the color matching processing on the basis of the conversion characteristic acquired in accordance with the photographing condition and the conversion characteristic corresponding to said device.

7. The apparatus according to claim 1, wherein the conversion characteristic is managed as data having a structure corresponding to or based upon Inter Color Profile Format.

8. An image processing method comprising the steps of:
    selecting, from a memory storing reference image data obtained by photographing a reference image including a plurality of color chips and color data in a device independent color space of the color chips, reference image data corresponding to a photographing condition of a color image;

acquiring photographing data of the color chips from the selected reference image data;

acquiring color data of the color chips from said memory; and calculating, on the basis of the acquired photographing data and color data, a conversion characteristic for converting the photographing data into the color data.

9. The method according to claim 8, further comprising the steps of:

acquiring photographing data of a gray scale contained in the selected reference image data;

acquiring color data of the gray scale from the memory;

estimating photographing data and color data of a color having higher lightness than a lightness of a white chip contained in the reference image; and adding the estimated photographing data and color data to the photographing data and color data of the color chips for calculating the conversion characteristic.

10. A computer program product comprising a computer readable medium having computer program code, for executing image processing, said product comprising:

selection process procedure code for selecting, from a memory storing reference image data obtained by photographing a reference image including a plurality of color chips and color data in a device independent color space of the color chips, reference image data corresponding to a photographing condition of a color image;

first acquisition process procedure code for acquiring photographing data of the color chips from the selected reference image data;

second acquisition process procedure code for acquiring color data of the color chips from the memory; and calculation process procedure code for calculating, on the basis of the acquired photographing data and color data, a conversion characteristic for converting the photographing data into the color data.

11. The product according to claim 10, further comprising:

third acquisition process procedure code for acquiring photographing data of a gray scale contained in the selected reference image data;

fourth acquisition process procedure code for acquiring color data of the gray scale from the memory;

estimation process procedure code for estimating photographing data and color data of a color having higher lightness than a lightness of a white chip contained in the reference image; and addition process procedure code for adding the estimated photographing data and color data to the photographing data and color data of the color chips for calculating the conversion characteristic.

12. A computer readable medium color conversion characteristic data for performing color matching processing on image data, wherein the color conversion characteristic data is obtained by image processing comprising the steps of:

selecting, from a memory storing reference image data obtained by photographing a reference image including a plurality of color chips and color data in a device independent color space of the color chips, reference image data corresponding to a photographing condition of a color image;

acquiring photographing data of the color chips from the selected reference image data;

acquiring color data of the color chips from said memory; and calculating the conversion characteristic data on the basis of the acquired photographing data and color data.

13. The medium according to claim 12, wherein the image processing further comprises the steps of:

acquiring photographing data of a gray scale contained in the selected reference image data;

acquiring color data of the gray scale from the memory;

estimating photographing data and color data of a color having higher lightness than a lightness of a white chip contained in the reference image; and adding the estimated photographing data and color data to the photographing data and color data of the color chips for calculating the conversion characteristic data.

14. An image processing method comprising the steps of:

inputting reference image data obtained by photographing a plurality of color chips by an image sensing device and standard values of the color chips;

performing extrapolation on the basis of the reference image data and the standard values; and generating color correction data for the image sensing device on the basis of a result of the extrapolation.

15. A computer program product comprising a computer readable medium having computer program code, for executing image processing, said product comprising:

input process procedure code for inputting reference image data obtained by photographing a plurality of color chips by an image sensing device and standard values of the color chips;

correction process procedure code for performing extrapolation on the basis of the reference image data and the standard values; and generation process procedure code for generating color correction data for the image sensing device on the basis of a result of the extrapolation.

* * * * *